(No Model.)
2 Sheets—Sheet 1.
A. DREYFUS.
APPARATUS FOR TREATING ARGOLS IN THE MANUFACTURE OF CREAM OF TARTAR.
No. 277,016.
Patented May 8, 1883.
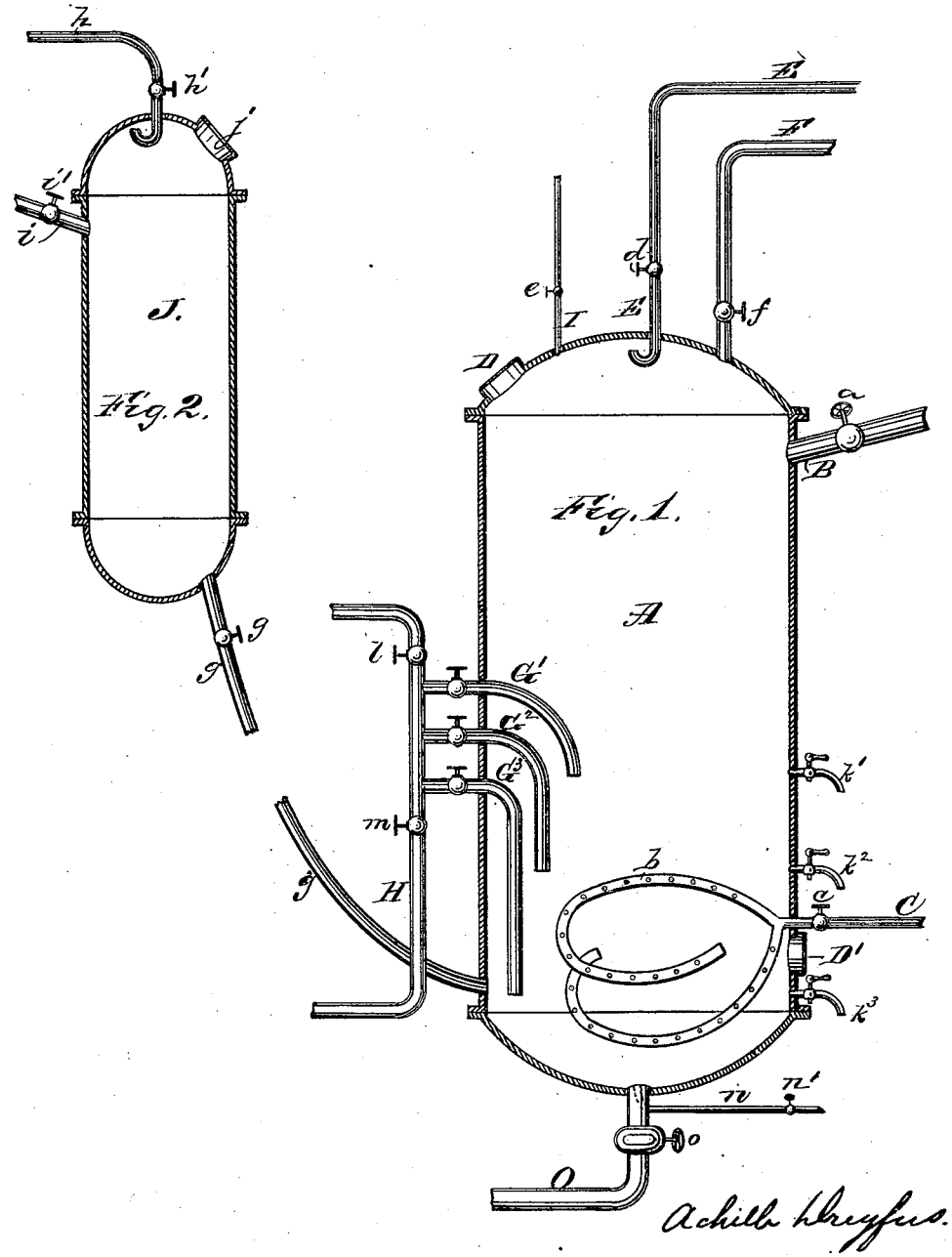
WITNESSES:
INVENTOR (No Model.) 2 Sheets—Sheet 2.
A. DREYFUS.
APPARATUS FOR TREATING ARGOLS IN THE MANUFACTURE OF CREAM OF TARTAR.
No. 277,016. Patented May 8, 1883.
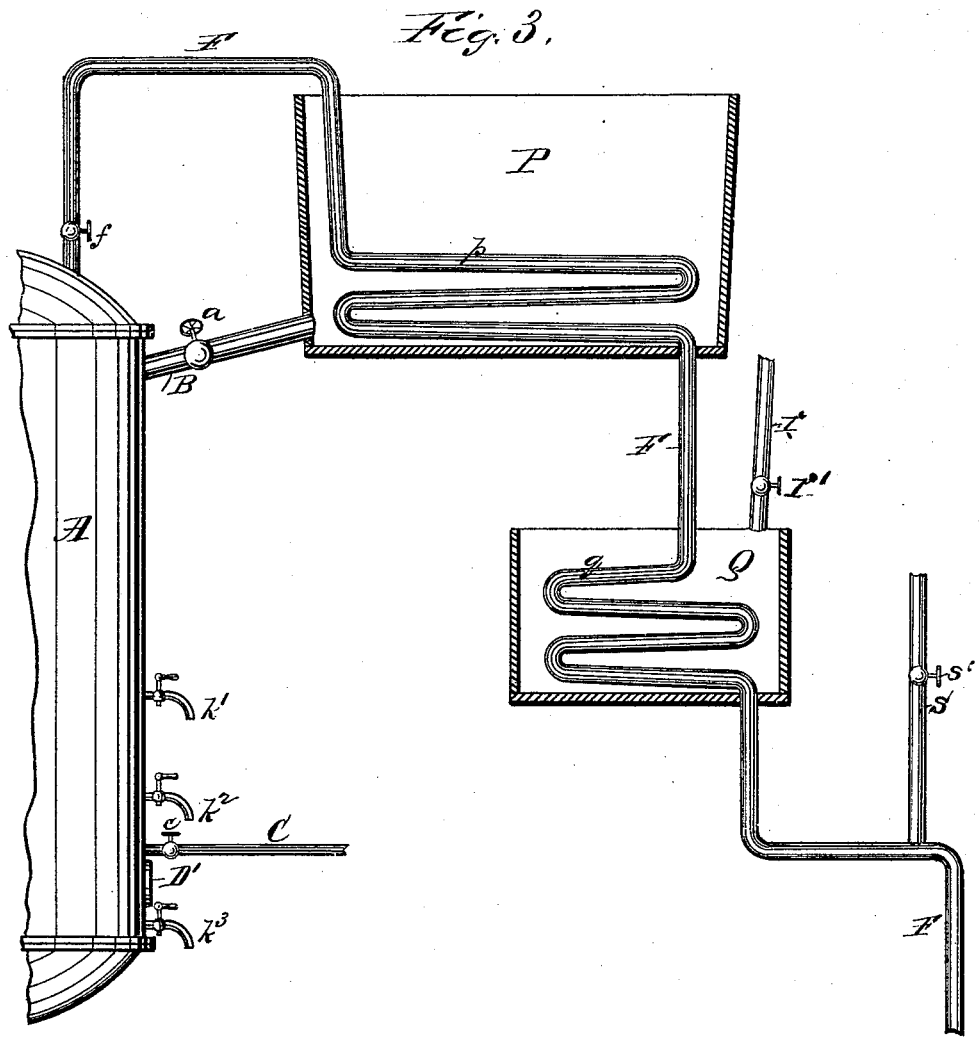
WITNESSES:
Achille Dreyfus.
INVENTOR

UNITED STATES PATENT OFFICE.

ACHILLE DREYFUS, OF NEW YORK, N. Y.

APPARATUS FOR TREATING ARGOLS IN THE MANUFACTURE OF CREAM OF TARTAR.

SPECIFICATION forming part of Letters Patent No. 277,016, dated May 8, 1883.

Application filed December 22, 1881. (No model.)

*To all whom it may concern:*

Be it known that I, ACHILLE DREYFUS, of the city, county, and State of New York, have invented an Improved Apparatus for Treating Argols in the Manufacture of Cream of Tartar, of which the following is a description, reference being had to the accompanying drawings, forming a part of this specification.

The object of my invention is to manufacture from argols cream of tartar chemically pure, or as nearly chemically pure as it is possible to make it in large quantities, and at a less cost than heretofore, and in such manner as that the offensive odors given off in the manufacture of cream of tartar from argols by processes heretofore in use may be substantially got rid of.

Figure 1 is a sectional view of my improved apparatus, showing the cylinder in which the argols are boiled and its different connections. Fig. 2 shows the apparatus in which the bone-black and china-clay used in the process of manufacturing are prepared before being put into the cylinder, and the connections by which those substances are forced into the cylinder. Fig. 3 shows the arrangement of tanks and steam-pipes, whereby the steam escaping during and after the boiling is utilized and the offensive odors are got rid of.

Similar letters of reference indicate the same parts.

A is a cylinder, of copper or copper lined, made preferably of a height about four times its horizontal diameter, and resting upon suitable supports.

B is a pipe furnished with a valve, $a$, for conducting water into the cylinder A.

C is a steam-pipe connecting with the boiler, and entering the cylinder either at the bottom or the top, and terminating at the bottom of the cylinder in a coil, $b$, which is pierced with small holes for the escape of the steam. The pipe C is also provided with a valve, $c$, for regulating the supply of steam.

D is a man-hole, through which the argols are passed into the cylinder when the latter is charged, and its cover should be made steam-tight.

D' is also a man-hole, placed at or near the bottom of the cylinder, to be opened after the solution has been drawn off, as hereinafter described.

E is a steam-pipe connecting with the boiler, which enters the cylinder in the top, and in the interior of the cylinder is preferably curved upward, as shown in the drawings. It is provided with a valve, $d$, for regulating the flow of steam.

F is a pipe for permitting the escape of steam from the cylinder. It is also provided with a valve, $f$, whereby the flow of steam through it is subject to the control of the operator.

$G'$ $G^2$ $G^3$ are pipes situated at different heights and all connecting with the pipe H, which last leads to the crystallizing-tank. (Not shown.)

$K'$ $K^2$ $K^3$ are test-cocks situated at different heights corresponding to the different heights of the orifices of the pipes $G'$ $G^2$ $G^3$, through which small quantities of the solution may from time to time be drawn off for the purpose of observing its condition at the different levels of the pipes $G'$ $G^2$ $G^3$.

I is a pipe through which air may enter the cylinder. It is also furnished with a valve, $e$.

$g$ is a pipe connecting with the apparatus shown by Fig. 2, in which the bone-black and china-clay are prepared preliminarily to introducing the same into the cylinder A during the operation of boiling.

O is a pipe through which the sediment is drawn off. It is provided with a valve, $o$, and a steam-pipe, $n$, provided with a cock, $n'$, enters the pipe O, and through the pipe O into the cylinder A, whereby a small jet of steam enters the cylinder A, near the orifice of the pipe O, sufficient to prevent the sediment being deposited on the valve $o$, or collecting about and choking the orifice of the pipe O. It is not essential that the pipe $n$ should enter the pipe O and pass through it to the mouth of the pipe O. It may enter through the sides of the cylinder A, or at any other place. All that is essential is that it should discharge upon the mouth of the pipe O to keep it clear, &c.

P is a tank or reservoir which contains the supply of water which is drawn off into the cylinder A by the pipe B. The steam-escape pipe F passes through this tank, forming therein the coil $p$, and after leaving the tank passes through the tank Q, also forming therein the coil $q$, and after leaving the tank Q the pipe F discharges into the drain or sewer.

$r$ is a pipe provided with a cock, $r'$, which conducts cold water into the tank Q; and $s$ is a pipe provided with the cock $s'$, which leads from a tank containing a disinfectant, (not shown in the drawings,) and connects with the pipe F after the latter leaves the tank Q.

The cylinder J is furnished with the pipes $i$ and $h$, the former being for the admission of water, it is provided with a cock, $i'$, and the latter for the admission of steam therein, it is provided with a cock, $h'$. It has also the man-hole $j$, by which the bone-black and china-clay are passed into the cylinder.

The operation of my improved apparatus and the process carried out therein and thereby are as follows: I fill the cylinder A, which has a capacity preferably of about fourteen thousand (14,000) gallons, about two-thirds full of water, which is conducted by the pipe B from the tank P. While the water continues to flow into the cylinder about forty-five hundred (4,500) pounds of ground argols are put in by the man-hole D, or with argols testing seventy-five per cent. bitartrate of potash, about one pound of argols to three gallons of water. When argols of a higher test are used the quantity of argols should be less, and when argols of a lower test are used the quantity should be greater, than above mentioned, the above proportion being preferably observed as nearly as possible. While the argols are being put in, steam is permitted to enter the cylinder by the pipe $n$, in order to prevent the argols settling in the pipe O and getting beyond the influence of the steam, which will enter from the coil $b$. After the argols are put in there are added about sixty pounds of sulphuric acid and about one hundred and fifty pounds of the muriate of potash. The man-hole is then closed so as to be steam-tight, and securely fastened, all the connections having been closed before the charging was commenced. When completed the steam for boiling is turned on, which enters the cylinder by the pipe C, and the water through the perforations of the coil $b$, and the valve $f$ of the pipe F is opened, so as to permit steam to escape. The violent agitation and boiling of the water ensue. The escape of steam by the pipe F should be so regulated by means of the valve $f$ as that there shall be a pressure of steam within the cylinder A of about thirty pounds, producing a corresponding increase of temperature above the boiling-point, the rapid dissolving of the bitartrate of potash contained in the argols being promoted thereby. After the boiling has progressed to such point as that the bitartrate of potash is dissolved, and the mucilaginous and other impurities contained in the argols are partly freed, about one hundred and twenty pounds of bone-black mixed with water are introduced into the cylinder by the pipe $g$, (which is provided with a cock, $g'$,) the same having been mixed in the small cylinder J, into which steam is admitted by the pipe $h$ in such volume that the pressure of the steam in J exceeds that in A, and when the cock $g'$ is opened it forces the bone-black mixture out of the cylinder J and into the solution in the cylinder A. After the bone-black mixture has thus been introduced into the cylinder A about two hundred and fifty pounds of china-clay, which has been mixed with water in the cylinder J, is also in like manner forced into the solution in the cylinder A. When the operation of boiling is completed the admission of steam by the pipes C and $n$ is cut off. The steam which is in the cylinder and in the solution is permitted to escape by the pipe F as rapidly as possible until the pressure of steam within the cylinder is reduced to zero. The escape of steam by the pipe F is then cut off, and steam is allowed to enter at the top of the cylinder by the pipe E until there is a steam-pressure within the cylinder of about five pounds. When the liquor has settled so as to be clear down to the mouth of the pipe $G'$, which may be determined by drawing off a small quantity at the same level by the test-cock $K'$, the solution is drawn off down to the level of the mouth of the pipe $G'$, through the pipes $G'$ and H, into the crystallizing-tanks by opening the valve $l$ and closing the valve $m$, and as the precipitation of the sediment and residues proceeds the clear solution is drawn off through the pipes $G^2$ and $G^3$ into the cyrstallizing-tanks, if the liquor is clear; or if the solution is not clear it is drawn off into a suitable receptacle by closing the valve $l$ and opening the valve $m$; or it may be drawn off into the receptacle into which the pipe O discharges. The steam entering by the pipe E serves to maintain, during the operation of settling and drawing off, the temperature of the solution to very nearly the degree which it reached during the boiling, or to such a degree as to prevent crystallization in the cylinder, and at the same time it facilitates the settling of the solution; and when the solution has settled, the pressure of this steam forces the clear liquor out of the cylinder into the crystallizing-tanks in such manner as to not disturb or stir up the solution which is below the level down to which it is desired to draw off. When the clear liquor has reached the crystallizing-tanks it is allowed to remain there for several days, during which, as it cools, the cream of tartar crystallizes on the sides and bottom of the tank as pure chemically as it can be made when operating on a large scale. After the clear solution is drawn off, the residuum containing the sediment and impurities is drawn off through the pipe O; and to facilitate this operation steam is admitted by the pipes C and $n$, which stirs up the residuum and clears the valve $o$. The valve $o$ being opened, the pressure of the steam, which has entered by the pipes E, C, and $n$, as described, and which still continues to enter, forces the residuum through the pipe O into any suitable receptacle, the mouth of the pipe O being kept clear by the steam issuing from $n$. After the residuum has been removed the valve $f$ is again opened and the steam in the interior of the cylinder escapes therefrom; but as all the steam will not escape through the pipe F the man-holes D and D' are both opened, a current of cold air is thereby made to circulate through the cylinder, and all the steam therein is rapidly driven out or condensed and the cylinder is ready to be charged the second time. The steam which escapes through the pipe F passes through the coil $p$ in the tank P, where it serves to heat almost to the boiling-point the water which is kept in the tank P, and passes therefrom through the coil $q$ in the tank Q, into which a stream of cold water runs from the pipe $r$, which serves to condense the steam as it passes through said coil, and thus condensed, after contact with a stream of caustic lime, carbolic acid, or any other disinfectant, which is led to the pipe F by the pipe $s$, it flows into the drain or sewer without causing any unpleasant or unhealthful effects in the atmosphere in the neighborhood. By utilizing the steam which escapes from the cylinder A to heat the water contained in the tank P, and using this water heated almost to the boiling-point for the next charging, a great economy in time and fuel is effected, the quantity of each required to bring a volume of fourteen thousand gallons of water, or thereabout, to the boiling-point being very considerable, and the cylinder A may be kept in almost constant use. Steam-indicators may be applied to both cylinders A and J to show the steam-pressure.

The chemical action of the sulphuric acid and muriate of potash which are introduced into the cylinder, as described, is well known to manufacturers of cream of tartar, and need not therefore be described.

An advantage arises from introducing the bone-black and china-clay into the cylinder after the boiling of the argols has commenced. The object of introducing the bone-black is to absorb the impurities, which otherwise would cause the crystals of cream of tartar to have a reddish color; and the object of the china-clay is to carry down or precipitate along with the sediment the bone-black. I have found by experience that when the bone-black is put into the boiling-cylinder when the argols are put in a far greater quantity of bone-black is required to decolorize the liquor than is necessary if the bone-black is put in when the argols are nearly dissolved, because, I suppose, if the bone-black is put into the water with the argols the former will absorb, to a considerable extent, the mucilaginous and other impurities which are contained in the argols, and which dissolve before the bitartrate of potash, and will consequently be able to absorb less of the coloring-matter, which seems to have a chemical affinity for the bitartrate of potash, and if the bone-black is introduced later in the operation the mucilaginous and other impurities will be precipitated without the agency of the bone-black, while the latter will obsorb the coloring-matters. When an open boiling-cylinder is used the introduction of the bone-black at any stage of the operation is easy; but this cannot be done when a closed boiling-cylinder is used by any means hitherto known or practiced, as in all boiling-cylinders known or used before my invention the bone-black could be introduced only through the man-hole, and if this should be opened for the purpose the steam and boiling water would certainly escape with such violence and in such volume as to certainly destroy the life of the operator. By my invention, however, the bone-black and china-clay can be introduced at any stage of the operation, and in such quantities from time to time as the state of the solution may require, and without the slightest danger to the operator. By drawing off the solution from the cylinder into several crystallizing-tanks I am enabled greatly to facilitate the process, for the crystallization will then not take place in the cylinder A, requiring it to remain idle until the crystallization is completed, but instead of that in these separate crystallizing-tanks, and the cylinder may be a second time charged while the solution is cooling and crystallizing in these separate tanks. These may be made of wood—an inexpensive material—and open at the top, so that the crystals of cream of tartar which have crystallized on the sides and bottom may be readily removed, and they may be of small capacity relatively to the boiling-cylinder, thereby increasing the crystallizing-surface, and at the same time increasing the cooling-surface, whereby the time required for crystallization is proportionally lessened; and as, when the crystallization takes place in the boiling-cylinder, crystals will form in the perforations of the steam-coil and inside of the pipe through which the supply of steam for boiling is obtained, ultimately closing entirely the pipe and the coil, this disadvantage is obviated by crystallizing in tanks, and I am able to draw off the clear liquor for this purpose by means of the admission of steam at the top of the cylinder, and the pipe which introduces this steam being curved upward, as shown in the drawings, the steam comes into contact first with a metal surface and does not strike the surface of the solution, so as to disturb it.

Although it is most advantageous to lead the steam-pipe $n$ into the draining-pipe O, as shown in the drawings, as in this position relatively to the mouth of the pipe O the steam issuing from the pipe $n$ will be more effective, yet the pipe $n$ may enter the cylinder without piercing the pipe O; but the orifice of the pipe $n$ should be as near as possible to the valve $o$ and the mouth of the pipe O.

I do not limit myself to a boiling-cylinder heated by live steam thrown into it as an element in my combination-claims hereinafter set forth, except when specially so claimed, for the benefits of many of my combinations will be realized, as well whether the boiling-cylinder be heated with live steam, as shown in the drawings, or by a jacket, a steam-coil, or direct fire under the bottom. It may, in fact, be heated in any one or more of the known ways.

Having described my invention, what I claim as new, and desire to secure by Letters Patent, is—

1. The process of manufacturing cream of tartar from argols by boiling the argols in water, with the aid of steam under pressure, within a closed vessel from which the steam is permitted to partially escape during the boiling, and introducing into the vessel, after the boiling has commenced, but before the settling of the solution has commenced, bone-black and china-clay, or equivalent substances, substantially as and for the purposes described.

2. In combination with the cylinder A, provided with a draining-pipe, O, the pipe $n$, discharging upon the mouth of the draining-pipe, substantially as and for the purposes set forth.

3. In combination with the closed cylinder A, provided with the steam-coil $b$, the steam-pipe E, and suitable steam-generating apparatus connected with the pipe E, substantially as and for the purposes set forth.

4. The closed cylinder A, in combination with the cylinder J, provided with the steam-pipe $h$, which pipe connects with a suitable steam-generating device, and the pipe $g$, substantially as and for the purposes set forth.

5. The cylinder A, provided with one or more draw-off pipes, G', located above the bottom of the cylinder, the steam-coil $b$, and the steam-escape pipe F, in combination with the tank P, substantially as and for the purposes set forth.

6. The cylinder A, provided with one or more draw-off pipes, G', the steam-coil $b$, and the steam-escape pipe F, in combination with the tank P and the tank Q, substantially as and for the purposes described.

7. The closed cylinder A, the draining-pipe O, the pipe F, a condenser, Q, and the disinfectant-supply pipe $s$, substantially as and for the purposes set forth.

8. The closed cylinder A, the draining-pipe O, the pipe F, the condenser Q, the water-supply pipe $r$, and the disinfectant-supply pipe $s$, substantially as and for the purposes set forth.

9. The combination of the cylinder A, the pipe F, the water-heating tank P, and the condenser Q, substantially as and for the purposes set forth.

10. The combination of the cylinder A, the pipe F, the water-heating tank P, the condenser Q, and the disinfectant-supply pipe $s$, substantially as and for the purposes set forth.

ACHILLE DREYFUS.

Witnesses:
FRANÇOIS LUEFFIE,
JOHN H. IVES.